United States Patent
Lu et al.

(10) Patent No.: US 8,870,473 B2
(45) Date of Patent: Oct. 28, 2014

(54) METHOD OF TERMINATING A FIBER OPTIC CABLE

(75) Inventors: Yu Lu, Eden Prairie, MN (US); Scott Carlson, Bloomington, MN (US); Andy Schmidt, Northfield, MN (US)

(73) Assignee: ADC Telecommunications, Inc., Berwyn, PA (US)

( * ) Notice: Subject to any disclaimer, the term of this patent is extended or adjusted under 35 U.S.C. 154(b) by 245 days.

(21) Appl. No.: 13/229,063

(22) Filed: Sep. 9, 2011

(65) Prior Publication Data

US 2012/0148203 A1 Jun. 14, 2012

Related U.S. Application Data

(60) Provisional application No. 61/382,682, filed on Sep. 14, 2010.

(51) Int. Cl.
*G02B 6/255* (2006.01)
*G02B 6/38* (2006.01)

(52) U.S. Cl.
CPC ............ *G02B 6/3846* (2013.01); *G02B 6/3887* (2013.01); *G02B 6/3898* (2013.01); *G02B 6/3885* (2013.01)
USPC ............................................ 385/95; 385/139

(58) Field of Classification Search
None
See application file for complete search history.

(56) References Cited

U.S. PATENT DOCUMENTS

| | | | |
|---|---|---|---|
| 4,648,168 A | 3/1987 | Nolf et al. | |
| 5,074,021 A | 12/1991 | Feng et al. | |
| 7,088,893 B2 | 8/2006 | Cooke et al. | |
| 7,090,407 B2 | 8/2006 | Melton et al. | |
| 7,264,402 B2 | 9/2007 | Theuerkorn et al. | |
| 7,349,605 B2 | 3/2008 | Noonan et al. | |
| 7,463,803 B2 | 12/2008 | Cody et al. | |
| 7,512,304 B2 | 3/2009 | Gronvall et al. | |
| 7,706,650 B2 | 4/2010 | Menendez | |
| 7,837,396 B2 | 11/2010 | Marcouiller | |
| 7,918,609 B2 | 4/2011 | Melton et al. | |
| 8,041,166 B2 | 10/2011 | Kachmar | |
| 8,184,934 B2 | 5/2012 | Keller et al. | |
| 8,317,410 B2 | 11/2012 | Marcouiller | |
| 2001/0033730 A1 | 10/2001 | Fentress | |
| 2006/0233506 A1 | 10/2006 | Noonan et al. | |
| 2007/0110384 A1 | 5/2007 | Cody et al. | |
| 2007/0196068 A1 | 8/2007 | Mullaney et al. | |
| 2008/0145008 A1 | 6/2008 | Lewallen et al. | |
| 2009/0034917 A1 | 2/2009 | Burwell et al. | |
| 2010/0086266 A1 | 4/2010 | Marcouiller et al. | |

FOREIGN PATENT DOCUMENTS

EP 1 855 134 A2 11/2007
WO WO2009/114771 9/2009

OTHER PUBLICATIONS

International Search Report and Written Opinion mailed Apr. 10, 2012.
Corning, "Duct Installation of Fiber Optic Cable," Standard Recommendation Procedure 005-011, Issue 11, Sep. 2010, 1 pg.

*Primary Examiner* — Sarah Hahm
(74) *Attorney, Agent, or Firm* — Merchant & Gould P.C.

(57) ABSTRACT

A method of terminating a fiber optic cable includes removing a portion of an outer jacket from an end of a fiber optic cable to expose an end portion of an optical fiber so that an end of the optical fiber extends a first axial length from the outer jacket. A portion of the fiber optic cable is coiled about a spool so that the end of the optical fiber extends a second axial length from the outer jacket. The second axial length is greater than the first axial length. A second optical fiber is spliced to the optical fiber of the fiber optic cable. The portion of the fiber optic cable is uncoiled so that the optical fiber retracts into the outer jacket of the fiber optic cable.

27 Claims, 9 Drawing Sheets

METHOD OF TERMINATING A FIBER OPTIC CABLE

CROSS REFERENCE TO RELATED APPLICATION

This application claims the benefit of provisional application Ser. No. 61/382,682, filed Sep. 14, 2010, which is incorporated herein by reference in its entirety.

SUMMARY

An aspect of the present disclosure relates to a method of terminating a fiber optic cable. The method includes removing a portion of an outer jacket from an end of a fiber optic cable to expose an end portion of an optical fiber so that an end of the optical fiber extends a first axial length from the outer jacket. A portion of the fiber optic cable is coiled about a spool so that the end of the optical fiber extends a second axial length from the outer jacket. The second axial length is greater than the first axial length. A second optical fiber is spliced to the optical fiber of the fiber optic cable. The portion of the fiber optic cable is uncoiled so that the optical fiber retracts into the outer jacket of the fiber optic cable.

Another aspect of the present disclosure relates to a method of terminating a fiber optic cable. The method includes removing a portion of an outer jacket from an end of a fiber optic cable to expose an end portion of an optical fiber so that an end of the optical fiber extends a first axial length from the outer jacket. A portion of the fiber optic cable is coiled about a spool so that the end of the optical fiber extends a second axial length from the outer jacket. The second axial length is greater than the first axial length. An optical fiber stub of a ferrule assembly is fusion spliced to the optical fiber of the fiber optic cable. The ferrule assembly is inserted into an opening of a connector assembly. The portion of the fiber optic cable is uncoiled so that the optical fiber retracts into the outer jacket of the fiber optic cable.

Another aspect of the present disclosure relates to a method of terminating a fiber optic cable. The method includes removing a portion of an outer jacket from an end of a fiber optic cable to expose an end portion of an optical fiber so that an end of the optical fiber extends a first axial length from the outer jacket. A portion of the fiber optic cable is coiled about a spool so that the end of the optical fiber extends a second axial length from the outer jacket. The second axial length is greater than the first axial length. An optical fiber stub of a ferrule assembly is fusion spliced to the optical fiber of the fiber optic cable. The ferrule assembly is inserted into an opening of a connector assembly. The portion of the fiber optic cable is uncoiled so that the optical fiber retracts into the outer jacket of the fiber optic cable. A strain relief boot is installed so that the strain relief boot covers a portion of the fiber optic cable and a portion of the connector assembly.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
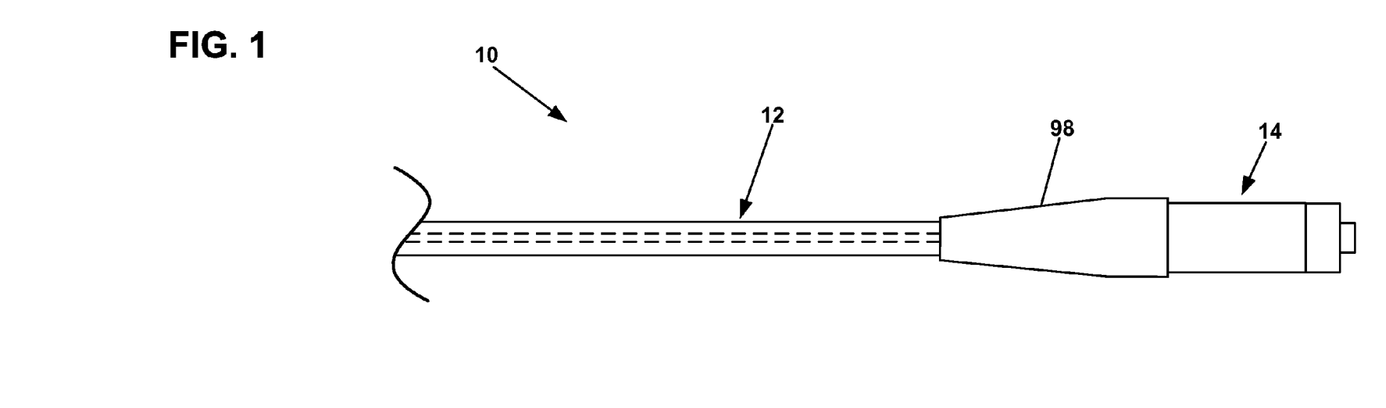
FIG. 1 is a side view of a fiber optic cable assembly having exemplary features of aspects in accordance with the principles of the present disclosure.

Referring now to FIG. 1, a fiber optic cable assembly 10 is shown. The fiber optic cable assembly includes a fiber optic cable 12 and a fiber optic connector 14.

Referring now to FIGS. 2-5, an exemplary fiber optic cable 12 suitable for use in the fiber optic cable assembly 10 is shown. In the depicted embodiment, the fiber optic cable 12 has a non-circular outer profile. For example, when viewed in transverse cross-section, the outer profile of the fiber optic cable 12 has a generally flat obround shape so that the cross-section of the fiber optic cable is longer along a major axis 16 than a minor axis 18. It will be understood, however, that the scope of the present disclosure is not limited to the fiber optic cable 12 having a non-circular profile as the fiber optic cable 12 could have a circular profile.

The fiber optic cable 12 includes at least one optical fiber 20, a strength member 22 and an outer jacket 24 that surrounds the optical fiber 20 and the strength member 22.

Figure 6:
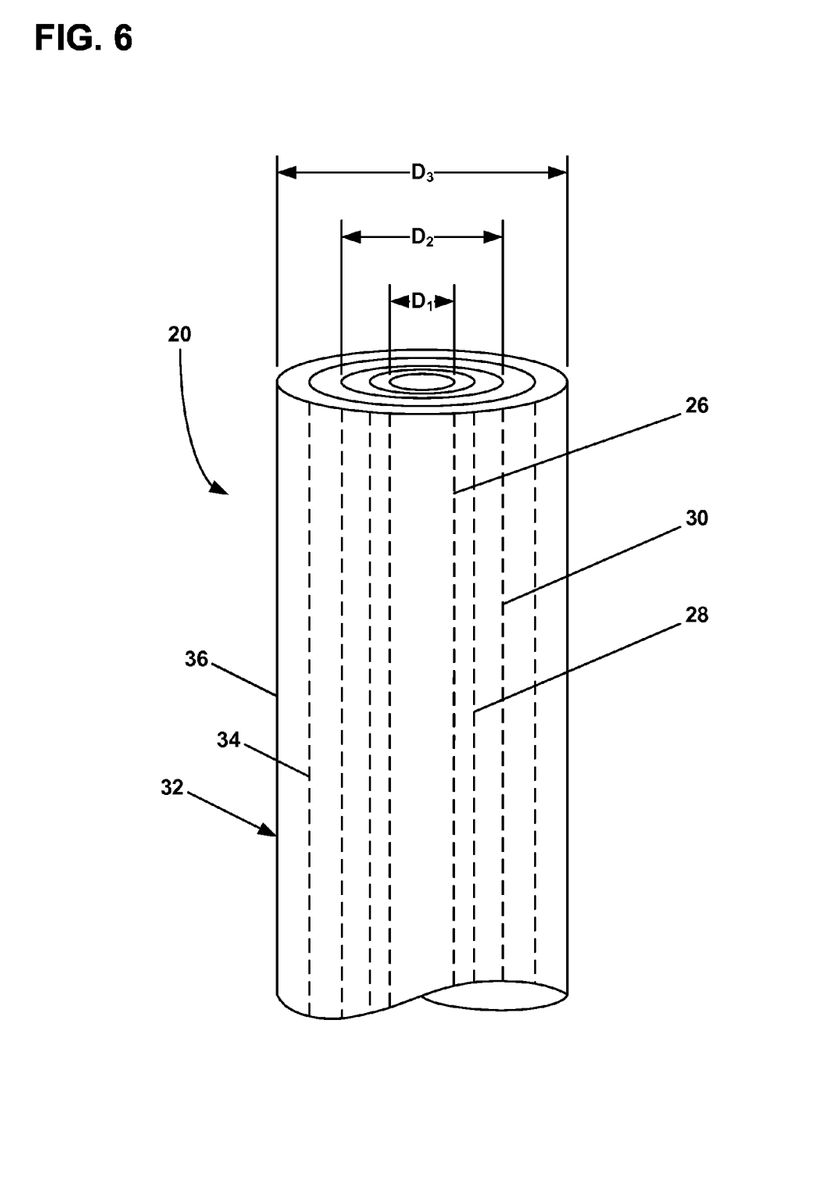
FIG. 6 is a schematic representation of an optical fiber of the fiber optic cable of FIG. 3.

Referring now to FIG. 6, the optical fiber 20 includes a core 26. The core 26 is made of a glass material, such as a silica-based material, having an index of refraction. In the subject embodiment, the core 26 has an outer diameter $D_1$ of less than or equal to about 10 μm.

The core 26 of each optical fiber 20 is surrounded by a first cladding layer 28 that is also made of a glass material, such as a silica based-material. The first cladding layer 28 has an index of refraction that is less than the index of refraction of the core 26. This difference between the index of refraction of the first cladding layer 28 and the index of refraction of the core 26 allows an optical signal that is transmitted through the optical fiber 20 to be confined to the core 26.

In one embodiment, a second cladding layer 30 surrounds the first cladding layer 28. The second cladding layer 30 has an index of refraction. In the subject embodiment, the index of refraction of the second cladding layer 30 is about equal to the index of refraction of the first cladding layer 28. The second cladding layer 30 is immediately adjacent to the first cladding layer 28. In the subject embodiment, the second cladding layer 30 has an outer diameter $D_2$ of less than or equal to 125 μm.

A coating 32 surrounds the second cladding layer 30. The coating 32 includes an inner layer 34 and an outer layer 36. In the subject embodiment, the inner layer 34 of the coating 32 is immediately adjacent to the second cladding layer 30 such that the inner layer 34 surrounds the second cladding layer 30. The inner layer 34 is a polymeric material (e.g., polyvinyl chloride, polyethylenes, polyurethanes, polypropylenes, polyvinylidene fluorides, ethylene vinyl acetate, nylon, polyester, or other materials) having a low modulus of elasticity. The low modulus of elasticity of the inner layer 34 functions to protect the optical fiber 20 from microbending.

The outer layer 36 of the coating 32 is a polymeric material having a higher modulus of elasticity than the inner layer 34. In the subject embodiment, the outer layer 36 of the coating 32 is immediately adjacent to the inner layer 34 such that the outer layer 36 surrounds the inner layer 34. The higher modulus of elasticity of the outer layer 36 functions to mechanically protect and retain the shape of optical fiber 20 during handling. In the subject embodiment, the outer layer 36 defines an outer diameter $D_3$ of less than or equal to 500 μm. In another embodiment, the outer layer 36 has an outer diameter $D_3$ of less than or equal to 250 μm.

Referring now to FIGS. 2-5, the fiber optic cable 12 can include a plurality of optical fibers 20. In the depicted embodiment of FIG. 4, the plurality of optical fibers 20 is arranged in an optical fiber ribbon 38. In the depicted embodiment of FIG. 4, the plurality of optical fibers 20 is arranged in a plurality of optical fiber ribbons 38. The outer jacket 24 can be shaped through an extrusion process and can be made by any number of different types of polymeric materials. Example materials for the outer jacket 24 include low-smoke zero halogen materials such as low-smoke zero halogen polyolefin and polycarbon. In other embodiments, the material can include thermal plastic materials such as polyethylene, polypropylene, ethylene-propylene, copolymers, polystyrene and styrene copolymers, polyvinyl chloride, polyamide (nylon), polyesters such as polyethylene terephthalate, polyetheretherketone, polyphenylene sulfide, polyetherimide, polybutylene terephthalate, as well as other plastic materials. In still other embodiments, the outer jacket 24 can be made of low density, medium density or high density polyethylene materials. Such polyethylene materials can include low density, medium density or high density ultra-high molecular weight polyethylene materials.

The outer jacket 24 defines a fiber passage 40 that extends through the fiber optic cable 12. In the depicted embodiment, the fiber passage 40 has a circular profile. The fiber passage 40 is centrally located in the outer jacket 24. In one embodiment, the fiber passage 40 is located at the geometrical center of the outer jacket 24. The optical fibers 20 are disposed in the fiber passage 40.

In one embodiment, a buffer tube 42 (shown in FIG. 5) is disposed in the fiber passage 40. The buffer tube 42 defines a passage 44 in which the optical fibers 20 are disposed. It will be understood, however, that the scope of the present disclosure is not limited to having a buffer tube 42.

Figure 3:
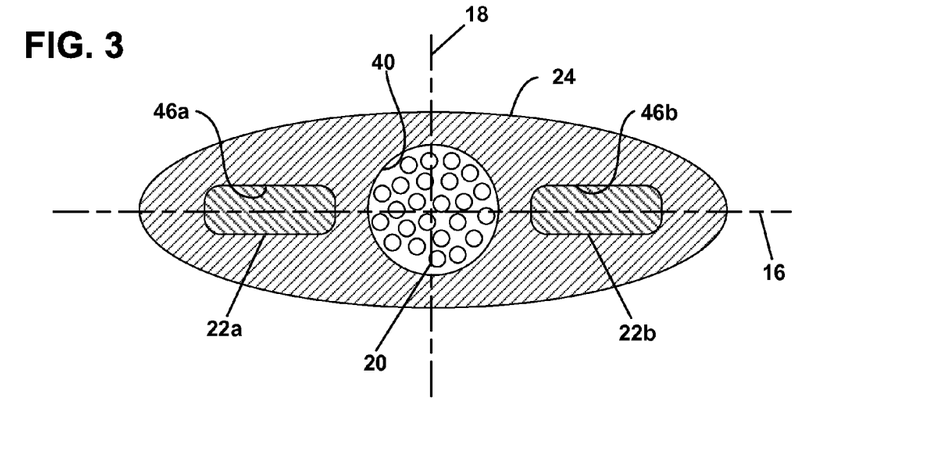
FIG. 3 is a cross-sectional view of the fiber optic cable taken on line 3-3 of FIG. 2.
Figure 4:
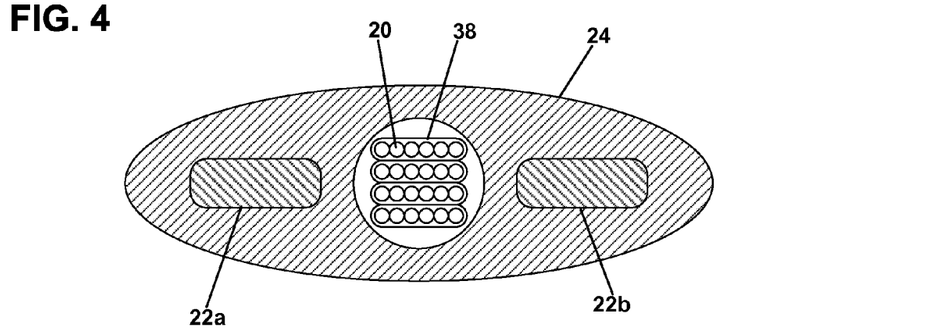
FIG. 4 is a cross-sectional view of an alternate embodiment of a fiber optic cable suitable for use with the fiber optic cable assembly of FIG. 1.
Figure 5:
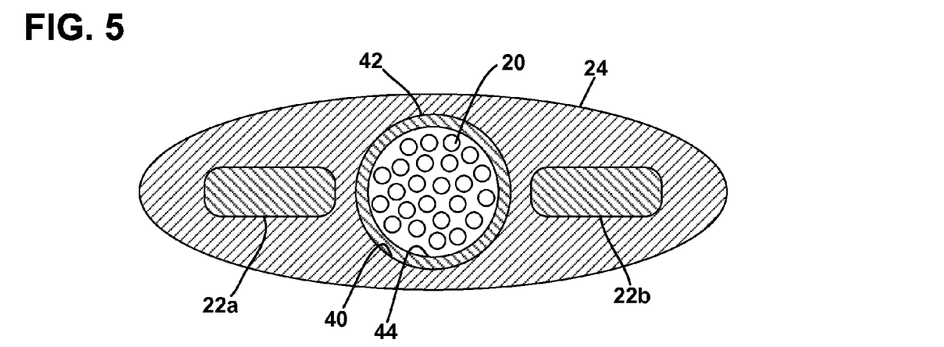
FIG. 5 is a cross-sectional view of an alternate embodiment of a fiber optic cable suitable for use with the fiber optic cable assembly of FIG. 1.

The outer jacket 24 further defines a longitudinal passage 46 that is generally parallel to the fiber passage 40. In the depicted embodiment, the outer jacket 24 defines a first longitudinal passage 46a and a second longitudinal passage 46b. The first and second longitudinal passages 46a, 46b are oppositely disposed about the fiber passage 40.

Each of the first and second longitudinal passages 46a, 46b has an elongated transverse cross-sectional profile (e.g., a flattened cross-sectional profile, an oblong cross-sectional profile, an obround cross-sectional profile, etc.). The first longitudinal passage 46a is adapted to receive the first strength member 22a of the fiber optic cable 12. The second longitudinal passage 46b is adapted to receive the second strength member 22b of the first optic cable 12.

Each of the first and second strength members 22a, 22b has a transverse cross-sectional profile that matches the transverse cross-sectional profile of the first and second longitudinal passages 46a, 46b, respectively. The first and second strength members 22a, 22b have constructions that are strong in tension. For example, in certain embodiments, the first and second strength members 22a, 22b provides the vast majority of the tensile load capacity of the fiber optic cable 12. In one embodiment, the strength members 22 are a plurality of aramid yarns. In another embodiment, the strength members 22 are glass fibers or rods (e.g., E-glass, S-glass, etc.).

Figure 2:
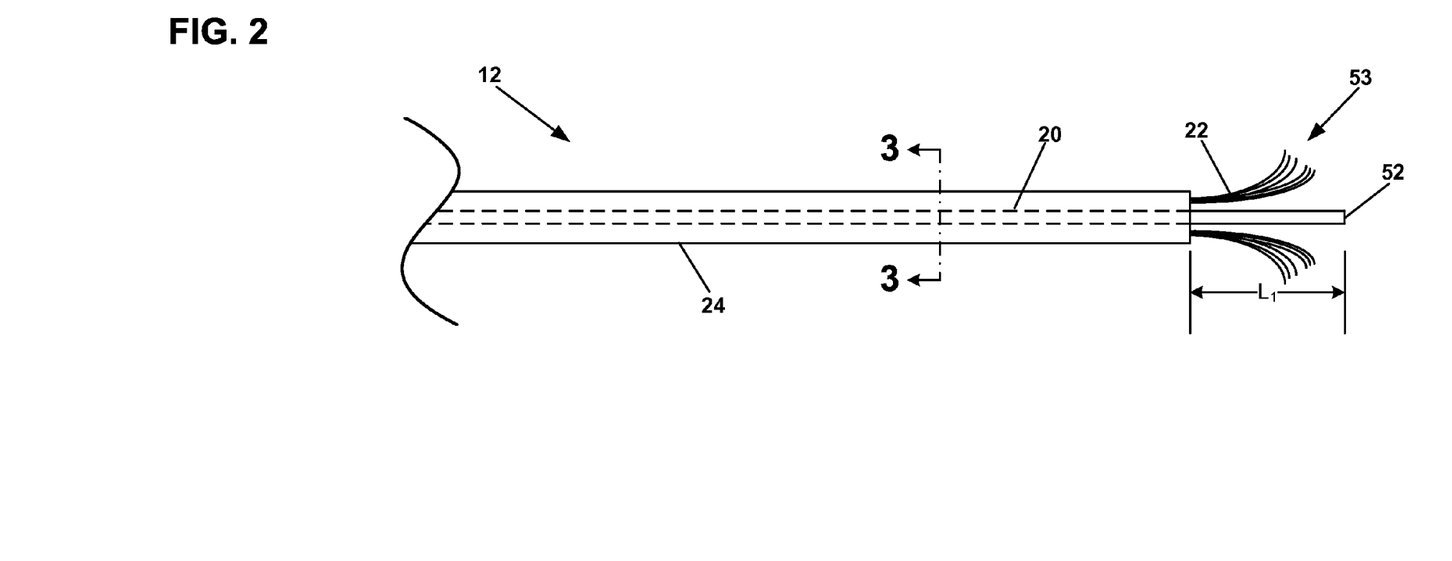
FIG. 2 is a side view of a fiber optic cable suitable for use with the fiber optic cable assembly of FIG. 1.
Figure 7:
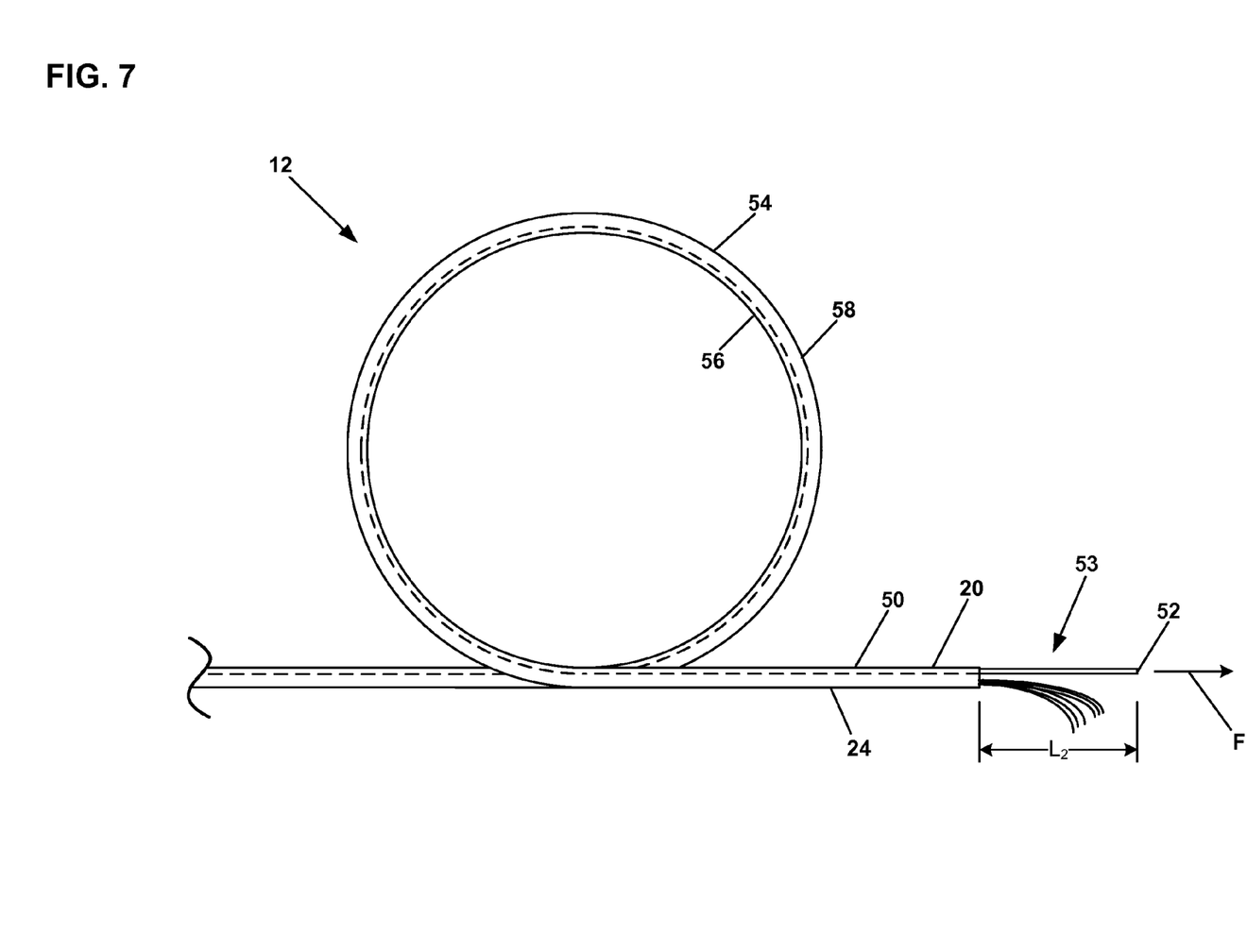
FIG. 7 is a side view of a portion of the fiber optic cable coiled so as to form a loop of fiber optic cable.

Referring now to FIGS. 2 and 7, a method for terminating the fiber optic cable 12 will be described. A portion of the outer jacket 24 is removed (e.g., stripped) from an end portion 50 of the fiber optic cable 12 so that an end 52 of an end portion 53 of the optical fiber 20 is exposed. The end 52 extends a first axial length $L_1$ from the outer jacket 24 of the fiber optic cable 12. In the depicted embodiment, a portion of the strength members 22 is also exposed.

With the end portion 53 of the optical fiber 20 of the fiber optic cable 12 exposed, a portion of the fiber optic cable 12 that includes the outer jacket 24 is coiled to form at least one loop 54. In one embodiment, the fiber optic cable 12 is coiled about a spool. In another embodiment, the fiber optic cable 12 is coiled without the aid of a spool. In one embodiment, the portion of the fiber optic cable 12 is coiled to form a plurality of loops 54.

The loop 54 of the fiber optic cable 12 includes an inner surface 56 and an outer surface 58. The inner surface 56 of the loop 54 of the fiber optic cable 12 is subjected to a compressive force while the outer surface 58 is subjected to a tensile force.

With the portion of the fiber optic cable 12 disposed in the loop 54, a force F is applied to the optical fiber 20. In the depicted embodiment, the force F is a tensile force that is applied at the end portion 53 of the optical fiber 20. In the depicted embodiment, the force F is applied in a direction that is generally parallel to the optical fiber 20. In another embodiment, the force F is a force that is applied in a direction that is generally perpendicular to the optical fiber 20.

The force F has a magnitude that is adapted to position the optical fiber 20 in the fiber passage 40 of the outer jacket 24 so that the optical fiber 20 is disposed adjacent to the inner surface 56 of the loop 54. The magnitude of the force F is less than the strength of the optical fiber 20 so that the application of the force F to the optical fiber 20 does not damage the optical fiber 20.

Since the inner surface 56 of the loop 54 of the fiber optic cable 12 is compressed, the end 52 of the optical fiber 20 extends from an end of the outer jacket 24 by a second axial length $L_2$ when the force F is applied to the optical fiber 20. The second axial length $L_2$ is greater than the first axial length $L_1$. The increase in length $(L_2-L_1)$ of the exposed optical fiber 20 is due to the compression of the inner surface 56 of the loop 54 of the fiber optic cable 12 and the optical fiber 20 being disposed adjacent to the inner surface 56 in the fiber passage 40. To increase the second axial length $L_2$, the fiber optic cable 12 can be coiled so that multiple loops 54 are formed.

Figure 8:
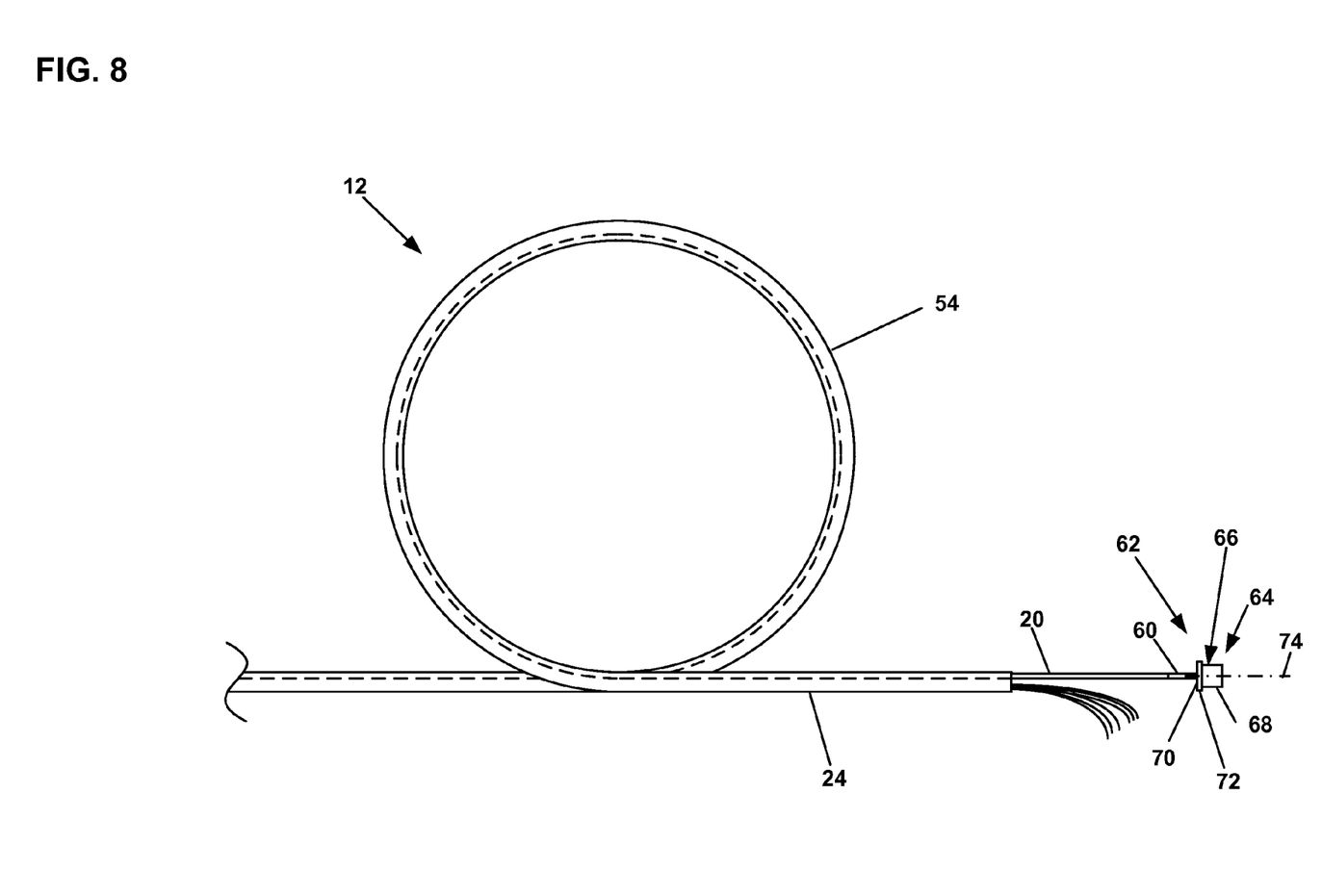
FIG. 8 is a side view of the fiber optic cable spliced to a ferrule assembly.

Referring now to FIG. 8, with the end 52 of the optical fiber 20 extending outwardly from the outer jacket 24 of the fiber optic cable 12, the optical fiber 20 can be spliced to a second optical fiber 60. In the depicted embodiment, the second optical fiber 60 is an optical fiber stub 60 that is part of a ferrule assembly 62. The ferrule assembly 62 can be a single fiber ferrule assembly or a multiple fiber ferrule assembly. The ferrule assembly 62 includes the at least one optical fiber stub 60 and a ferrule 64.

The ferrule 64 includes a body 66 having a first end 68 and an oppositely disposed second end 70. The ferrule 64 defines a fiber passage that extends through the first and second ends 68, 70 of the body 66. The fiber passage is adapted to receive a first end portion of the optical fiber stub 60. In the depicted embodiment, the ferrule 64 defines a single fiber passage. In other embodiments, the ferrule 64 defines a plurality of fiber passages.

In the depicted embodiment, the second end 70 of the body 66 includes a flange 72. The flange 72 extends outwardly from the second end 70 so that it is generally perpendicular to a central longitudinal axis 74 of the body 66.

Figure 9:
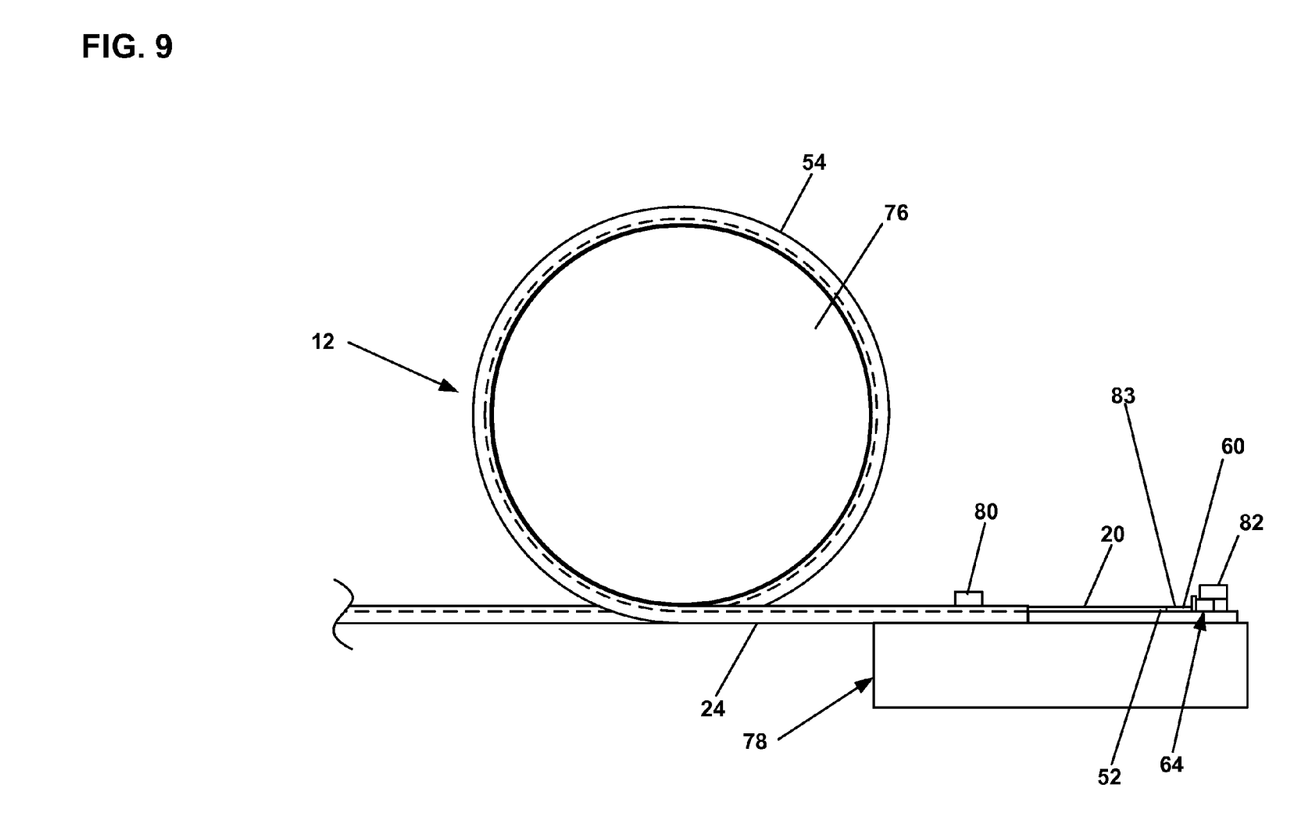
FIG. 9 is a view of the fiber optic cable and the ferrule assembly engaged to a workstation.

Referring now to FIGS. 8 and 9, with the fiber optic cable 12 coiled around a spool 76, the fiber optic cable 12 is secured to a workstation 78. In the depicted embodiment, a first clamp 80 secures the fiber optic cable 12 to the workstation 78. A second clamp 82 secures the ferrule assembly 62 to the workstation 78. The fiber optic cable 12 and the ferrule assembly 62 are secured to the workspace 78 so that the optical fiber 20 of the fiber optic cable 12 and a second end portion 82 of the optical fiber stub 60 of the ferrule assembly 62 are generally aligned.

The optical fiber stub 60 is positioned so that the second end portion 83 is aligned with and abuts the end 52 of the optical fiber 20 of the fiber optic cable 12. With the second end portion 82 of the optical fiber stub 60 abutting the end 52 of the optical fiber 20 of the fiber optic cable 12, the optical fiber stub 60 is spliced to the optical fiber 20 of the fiber optic cable 12. In the depicted embodiment, the optical fiber stub 60 is fusion spliced to the optical fiber 20 of the fiber optic cable 12.

Figure 10:
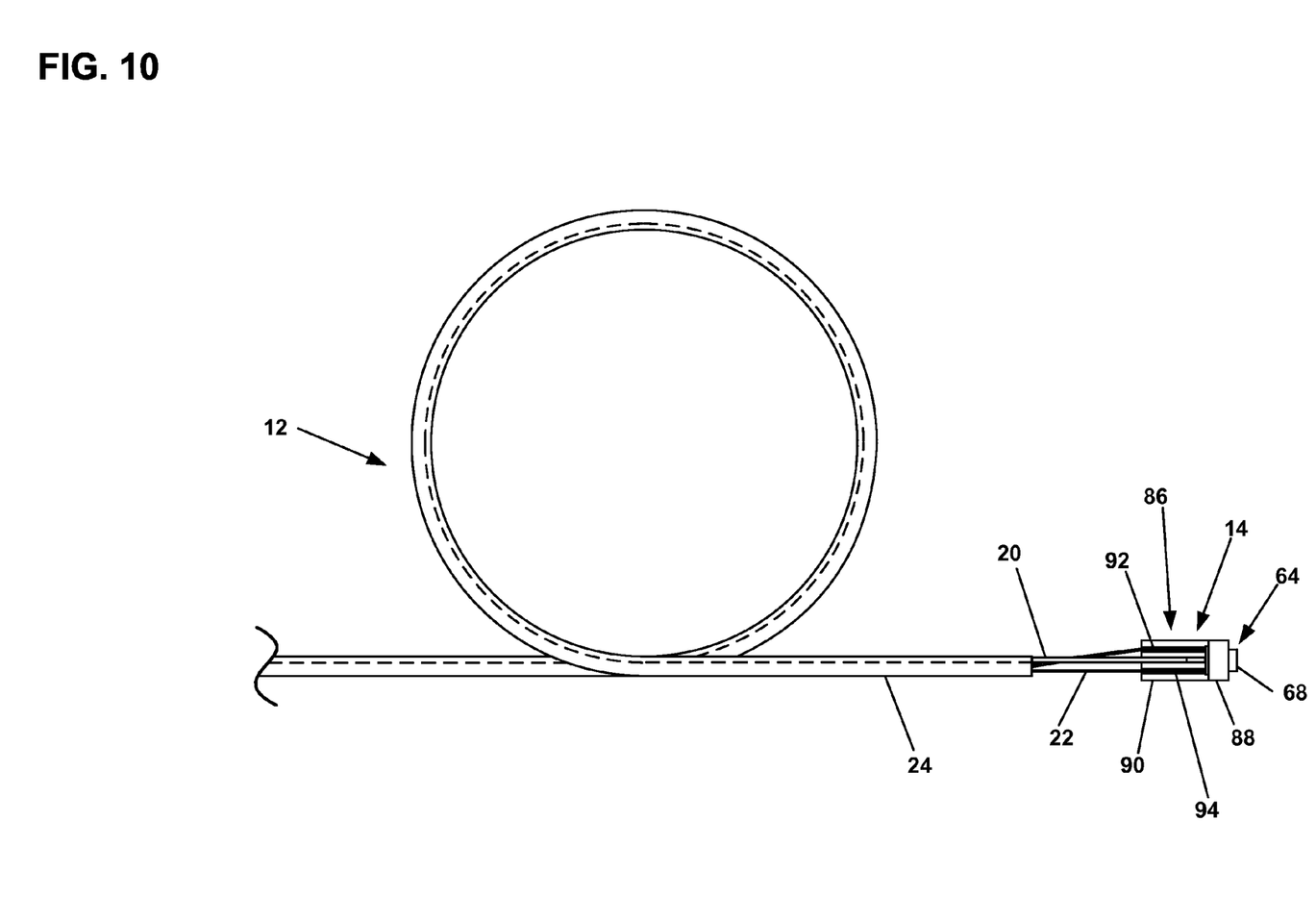
FIG. 10 is a view of the ferrule assembly disposed in a connector body of a connector assembly.
Figure 11:
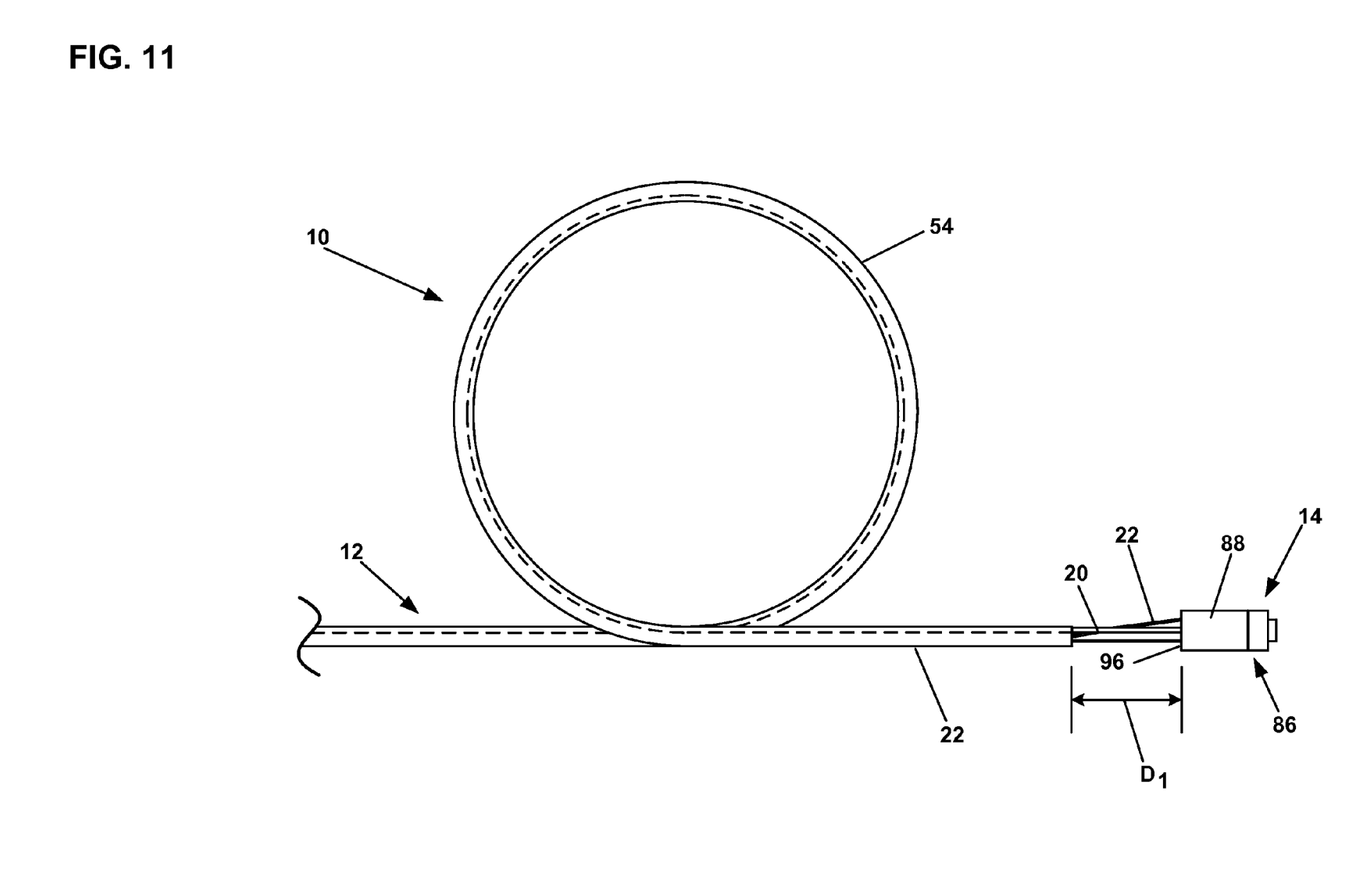
FIG. 11 is a view of the connector assembly engaged to the fiber optic cable when the fiber optic cable is coiled.

Referring now to FIGS. 10 and 11, the installation of fiber optic connector 14 will be described. The fiber optic connector 14 includes a connector body 86 and a cover 88.

The connector body 86 includes a first end 88 and an oppositely disposed second end 90. The first end 88 defines an opening that is adapted to receive the first end 68 of the ferrule 64. With the first end 68 of the ferrule 64 disposed in the opening of the connector body 86, the optical fiber stub 60 and a portion of the end portion 53 of the optical fiber 20 of the fiber optic cable 12 are positioned in a central groove 92 of the connector body 86.

The first and second strength members 22a, 22b are positioned in a pair of grooves 94 that extends in a generally parallel direction to the central groove 92 of the connector body 86. In one embodiment, the first and second strength members 22a, 22b are secured in the grooves 94 by a first adhesive (e.g., epoxy). In another embodiment, the optical fiber stub 60 and the portion of the end portion 53 of the optical fiber 20 of the fiber optic cable 12 are secured in the central groove 92 by a second adhesive (e.g., epoxy). In one embodiment, the first and second adhesives are the different. With the first and second strength members 22a, 22b secured in the pair of grooves 94 and the optical fiber stub 60 and the portion of the end portion 53 of the optical fiber 20 of the fiber optic cable 12 secured in the central groove 92, the cover 88 is engaged to the connector body 86.

Figure 12:
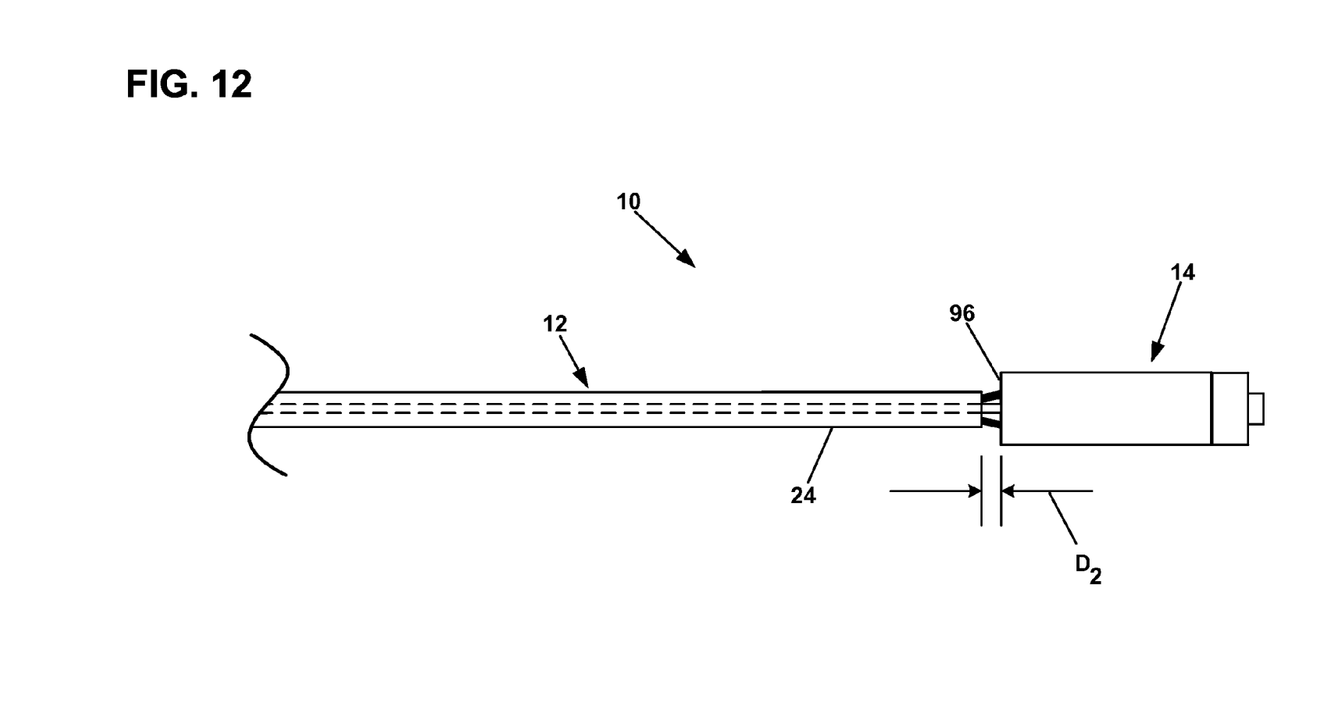
FIG. 12 is a view of the connector assembly engaged to the fiber optic cable when the fiber optic cable is uncoiled.

Referring now to FIGS. 1, 11 and 12, with the fiber optic cable 12 still coiled around the spool 78, an end surface 96 of the fiber optic connector 14 is disposed a first axial distance $D_1$ from the end of the outer jacket 24 of the fiber optic cable 12. With the fiber optic connector 14 engaged to the fiber optic cable 12, the fiber optic cable 12 is uncoiled from the spool 78. As the fiber optic cable 12 is uncoiled from the spool 78, the optical fiber 20 retracts into the outer jacket 24 so that the end surface 96 of the fiber optic connector 14 is disposed at a second axial distance $D_2$ from the end of the outer jacket 24 of the fiber optic cable 12. In the depicted embodiment, the second axial distance $D_2$ is less than the first axial distance $D_1$.

In one embodiment, a strain relief boot 98 is installed over a portion of the fiber optic cable 12 and a portion of the fiber optic connector 14. The strain relief boot 98 is adapted to reduce the risk of damage to the fiber optic cable 12 at the fiber optic connector 14 from bending.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

What is claimed is:

1. A method for terminating a fiber optic cable, the method comprising:
   removing a portion of an outer jacket from an end of a fiber optic cable to expose an end portion of an optical fiber, wherein an end of the optical fiber extends a first axial length from the outer jacket;
   coiling a portion of the fiber optic cable so that the end of the optical fiber extends a second axial length from the outer jacket, wherein the second axial length is greater than the first axial length and wherein the optical fiber is positioned within the outer jacket along the coiled portion of the fiber optic cable;
   splicing a second optical fiber to the optical fiber; and
   uncoiling the coiled portion of the fiber optic cable so that the optical fiber retracts into the outer jacket of the fiber optic cable.

2. The method of claim 1, wherein the second optical fiber is fusion spliced to the optical fiber.

3. The method of claim 1, wherein the second optical fiber is an optical fiber stub of a ferrule assembly.

4. The method of claim 3, wherein the ferrule assembly includes a ferrule that is disposed in a connector assembly.

5. The method of claim 4, wherein the connector assembly includes a connector body and a cover.

6. The method of claim 5, wherein the optical fiber of the fiber optic cable is disposed in a central groove of the connector body.

7. The method of claim 6, wherein the optical fiber is secured in the central groove by an adhesive.

8. The method of claim 6, wherein strength members of the fiber optic cable are disposed in a pair of grooves in the connector body that is generally parallel to the central groove.

9. The method of claim 1, wherein the fiber optic cable includes a plurality of optical fibers.

10. A method for terminating a fiber optic cable, the method comprising:
    removing a portion of an outer jacket from an end of a fiber optic cable to expose an end portion of an optical fiber, wherein an end of the optical fiber extends a first axial length from the outer jacket;
    coiling a portion of the fiber optic cable and thereby forming an inner jacket surface on the coiled portion of the fiber optic cable;
    positioning the optical fiber toward the inner jacket surface of the coiled portion so that the end of the optical fiber extends a second axial length from the outer jacket, wherein the second axial length is greater than the first axial length;

fusion splicing an optical fiber stub of a ferrule assembly to the optical fiber;

inserting the ferrule assembly through an opening in a connector assembly; and uncoiling the coiled portion of the fiber optic cable so that the optical fiber retracts into the outer jacket of the fiber optic cable.

11. The method of claim 10, wherein the connector assembly includes a connector body and a cover.

12. The method of claim 11, wherein the optical fiber of the fiber optic cable is disposed in a central groove of the connector body.

13. The method of claim 12, wherein the optical fiber is secured in the central groove by a first adhesive.

14. The method of claim 12, wherein strength members of the fiber optic cable are disposed in a pair of grooves in the connector body that is generally parallel to the central groove.

15. The method of claim 14, wherein the strength members are secured in the grooves by a second adhesive.

16. The method of claim 10, wherein the fiber optic cable includes a plurality of optical fibers.

17. A method for terminating a fiber optic cable, the method comprising:

removing a portion of an outer jacket from an end of a fiber optic cable to expose an end portion of an optical fiber, wherein an end of the optical fiber extends a first axial length from the outer jacket;

coiling a portion of the fiber optic cable about a spool so that the end of the optical fiber extends a second axial length from the outer jacket, wherein the second axial length is greater than the first axial length;

fusion splicing an optical fiber stub of a ferrule assembly to the optical fiber;

inserting the ferrule assembly through an opening in a connector assembly;

uncoiling the portion of the fiber optic cable so that the optical fiber retracts into the outer jacket of the fiber optic cable; and installing a strain relief boot so the strain relief boot covers a portion of the fiber optic cable and a portion of the connector assembly.

18. The method of claim 17, wherein the connector assembly includes a connector body and a cover.

19. The method of claim 18, wherein the optical fiber of the fiber optic cable is disposed in a central groove of the connector body.

20. The method of claim 19, wherein strength members of the fiber optic cable are disposed in a pair of grooves in the connector body that is generally parallel to the central groove.

21. A method for terminating a fiber optic cable, the method comprising:

removing a portion of an outer jacket from an end of a fiber optic cable to expose an end portion of an optical fiber, wherein an end of the optical fiber extends a first axial length from the outer jacket;

coiling a portion of the fiber optic cable and thereby forming an inner jacket surface on the coiled portion of the fiber optic cable;

positioning the optical fiber toward the inner jacket surface of the coiled portion so that the end of the optical fiber extends a second axial length from the outer jacket, wherein the second axial length is greater than the first axial length;

processing the exposed end portion of the optical fiber to a connector assembly; and uncoiling the coiled portion of the fiber optic cable so that the optical fiber retracts into the outer jacket of the fiber optic cable.

22. The method of claim 21, wherein processing includes optically splicing the exposed end portion to another optical fiber.

23. The method of claim 21, wherein processing includes coupling the exposed end portion to a connector assembly.

24. A method for connectorizing a fiber optic cable, the method comprising:

coiling a portion of the fiber optic cable and thereby forming an inner surface on an outer jacket of the fiber optic cable about the coiled portion of the fiber optic cable;

positioning an optical fiber of the fiber optic cable toward the inner surface so that an end portion of the optical fiber extends outwardly from an end of the outer jacket;

processing the end portion of the optical fiber; and uncoiling the portion of the fiber optic cable so that the optical fiber retracts into the outer jacket of the fiber optic cable.

25. The method of claim 24, wherein the coiling of the coiled portion includes coiling the fiber optic cable about a spool.

26. The method of claim 24, wherein the processing of the end portion of the optical fiber includes splicing the end portion of the optical fiber.

27. The method of claim 24, wherein the processing of the end portion of the optical fiber includes connectorizing the end portion of the optical fiber.

* * * * *